(12) United States Patent
Rahardianto et al.

(10) Patent No.: US 12,203,842 B2
(45) Date of Patent: Jan. 21, 2025

(54) METHOD AND APPARATUS FOR REAL-TIME DIRECT SURFACE FOULING AND SCALE MONITORING OF HEAT TRANSFER SURFACES

(71) Applicant: Noria Water Technologies, Inc., Los Angeles, CA (US)

(72) Inventors: Anditya Rahardianto, Los Angeles, CA (US); Bilal Muhammed Khan, Los Angeles, CA (US)

(73) Assignee: Noria Water Technologies, Inc., Los Angeles, CA (US)

( * ) Notice: Subject to any disclaimer, the term of this patent is extended or adjusted under 35 U.S.C. 154(b) by 310 days.

(21) Appl. No.: 17/914,346

(22) PCT Filed: Mar. 25, 2020

(86) PCT No.: PCT/US2020/024773
§ 371 (c)(1),
(2) Date: Sep. 25, 2022

(87) PCT Pub. No.: WO2021/194489
PCT Pub. Date: Sep. 30, 2021

(65) Prior Publication Data
US 2023/0119268 A1    Apr. 20, 2023

(51) Int. Cl.
*G01N 17/00*  (2006.01)
*F28F 19/00*  (2006.01)
(Continued)

(52) U.S. Cl.
CPC .......... *G01N 17/008* (2013.01); *F28F 19/00* (2013.01); *G01N 21/09* (2013.01); *G01N 21/85* (2013.01);
(Continued)

(58) Field of Classification Search
CPC ..... G01B 11/06; G01B 11/0616; G01B 11/30; G01B 11/303; G01N 17/00; G01N 17/002;
(Continued)

(56) References Cited

U.S. PATENT DOCUMENTS 3,490,271 A * 1/1970 Hays ................. G01N 17/00
73/86
3,637,314 A * 1/1972 Groot ................ G01N 21/8507
356/428

(Continued)

FOREIGN PATENT DOCUMENTS

WO    WO2019/209239 A1    10/2019

OTHER PUBLICATIONS

Awad, "Fouling of heat transfer surfaces", Heat transfer-theoretical analysis, experimental investigations and Industrial systems, (20110100), URL: https://www.researchgate.net/profile/Mostafa_Awad/publication/221910395_Fouling_of_Heat_Transfer_Surfaces/links/0046353c5b78685e3d000000/Fouling-of-Heat-Transfer-Surfaces.pdf, (May 23, 2020), XP055861547.

(Continued)

*Primary Examiner* — Gordon J Stock, Jr.
(74) *Attorney, Agent, or Firm* — Nolan Heimann LLP; Adam Diament

(57) ABSTRACT

A heat transfer surface monitoring (HTSM) system and cell for direct detection and monitoring of fouling, scaling, corrosion, and pitting of heat transfer surfaces. The system has a heat transfer plate (HTP) that has a heat transfer monitoring surface (HTMS). The system also includes an edge-lit light guide and light source to illuminate the HTMS, a fluid flow channel module, a heating/cooling module, a surface imaging module to view the HTMS, and a system controller. The environment is controlled to mimic the (Continued)

environment within heat exchange equipment, which are indicative of the changes inside heat exchange equipment. Output of signals relating to the HTMS are used as a guide mitigate problems related to the monitored heat exchange equipment. The system can also use a heat exchanger cylindrical tube with slit light guides along the tube, and the surface imaging module views the inner surface of the heat exchanger cylindrical tube.

22 Claims, 13 Drawing Sheets

(51) Int. Cl.
  *G01N 15/00* (2024.01)
  *G01N 21/05* (2006.01)
  *G01N 21/09* (2006.01)
  *G01N 21/85* (2006.01)
  *G01N 21/88* (2006.01)
  *G01N 21/94* (2006.01)
(52) U.S. Cl.
  CPC ......... *G01N 21/8806* (2013.01); *G01N 21/94* (2013.01); *F28F 2265/00* (2013.01); *G01N 2015/0053* (2013.01); *G01N 2021/052* (2013.01)
(58) Field of Classification Search
  CPC ...... G01N 17/008; G01N 21/05; G01N 21/09; G01N 21/15; G01N 21/49; G01N 21/53; G01N 21/85; G01N 21/8803; G01N 21/8806; G01N 21/94; G01N 21/954; G01N 2021/155; G01N 2021/157; G01N 2021/052; G01N 2021/945; G01N 2021/8427; G01N 15/0227; G01N 2015/0053; F28F 27/00; F28F 19/00; F28F 19/002; F28F 2200/00; F28F 2200/005; F28F 2265/00; F28F 2210/00
  See application file for complete search history.

(56) References Cited

U.S. PATENT DOCUMENTS

| | | | | |
|---|---|---|---|---|
| 4,916,317 | A * | 4/1990 | Gabriel | G01N 21/57 |
| | | | | 250/341.8 |
| 5,185,533 | A * | 2/1993 | Banks | G01B 11/0616 |
| | | | | 250/575 |
| 5,332,900 | A * | 7/1994 | Witzke | G01N 33/287 |
| | | | | 250/341.1 |
| 5,992,505 | A | 11/1999 | Moon | |
| 7,518,720 | B2 * | 4/2009 | Kolp | G01N 21/09 |
| | | | | 356/244 |
| 9,541,492 | B2 * | 1/2017 | Howard | G01N 21/05 |
| 9,810,616 | B2 * | 11/2017 | Tucker | G01N 21/0317 |
| 9,964,399 | B2 * | 5/2018 | Hundstad | G01N 21/8851 |
| 10,352,845 | B2 * | 7/2019 | Rowe | H04N 23/11 |
| 10,429,331 | B2 * | 10/2019 | Phillips | F28F 27/00 |
| 10,960,357 | B2 | 3/2021 | Anditya | |
| 11,946,841 | B2 * | 4/2024 | Von Drasek | G01N 17/006 |
| 11,953,445 | B2 * | 4/2024 | Von Drasek | G06V 10/22 |
| 2010/0243208 | A1 | 9/2010 | Kar et al. | |
| 2013/0003048 | A1 | 1/2013 | Caussin De et al. | |
| 2014/0106199 | A1 | 4/2014 | Meintschel et al. | |

OTHER PUBLICATIONS

Search Report form the International Searching Authority from Parent PCT Patent Application.
Written Opinion from the International Searching Authority from Parent PCT Patent Application.

* cited by examiner

METHOD AND APPARATUS FOR REAL-TIME DIRECT SURFACE FOULING AND SCALE MONITORING OF HEAT TRANSFER SURFACES

CROSS-REFERENCE TO RELATED APPLICATIONS

This application is the National Stage (§ 371) of International Application No. PCT/US2020/024773, dated Mar. 20, 2020, incorporated herein by reference.

FEDERALLY SPONSORED RESEARCH OR DEVELOPMENT

None.

FIELD OF THE DISCLOSURE

The present invention relates to a heat transfer surface monitoring (HTSM) system, and more specifically to an HTSM system for direct detection of surface fouling and mineral scaling.

BACKGROUND OF THE INVENTION

Fouling, mineral scaling, and corrosion of heat exchange equipment is a challenging issue in various industries. The ability to for early detection of fouling, scaling, and corrosion is therefore important to enable timely implementation of corrective action. Previous approaches (Holmes and Rohrback 1979, Rhoades and Finley 1984, Otake, Miyai et al. 1988, Perkins, Waterman et al. 1993, Winters, Stokes et al. 1993, Tsou and Garey 1997, Moon 1999, Hays and Hoernle 2009, Seida, Flocken et al. 2011, Veau, Petit et al. 2014, Chattoraj, Murcia et al. 2017, Menn and Krimerman 2017) have relied on indirect methods for fouling/scaling/corrosion detection based on, for example, calculations of heat transfer coefficients, determined based on temperature and flow measurements in the heat exchange equipment being monitored. Alternative methods include the use of corrosion coupons, which are pre-weighed and measured metal strips which are mounted in a coupon rack. Corrosion coupons, for example, can be used to estimate the rate of metal corrosion by comparing the initial weight with the weight following a prescribed period of time (e.g., 60, 90 or 120 days) of exposure to the water in the system. To date, however, direct and real-time optical and spectral monitoring of heated/cooled heat transfer surfaces for fouling/scaling/corrosion detection has not yet been reported in either the scientific literature or been available commercially.

There have been various attempts to combat fouling and scaling. For example, in the case of mineral scaling, antiscalants are utilized to retard mineral salt nucleation and growth with additional additives to promote suspensions of mineral precipitate in the bulk solution. However, since it is difficult to internally view scaling of running heat exchange equipment, the progression of damage to the system occurs before one would ascertain the need for using antiscalants. Prevention of fouling due to deposition of particulate matter can in certain cases be reduced via the use of dispersant additives that are fed to the water stream. Also, pretreatment of the feed water to heat exchange equipment, e.g., via addition of water treatment chemicals or filtration, can reduce equipment fouling propensity due to particulate and biofoulants. Mitigation can also include, but is not limited to, adjustments of feed flow rate and pressure and antiscalant dose.

Various approaches have been proposed for real-time detection of mineral scaling and fouling of heat exchange equipment. The majority of the proposed approaches rely on aggregate and indirect measures of membrane fouling and scaling, such as increase or decrease due to scaling or corrosion. Methods such as these do not provide early detection of scaling and corrosion and cannot be used to ascertain the type of scaling/fouling that occur. Previous systems and methods have not sufficiently addressed the needs of the industry for early detection because they typically require a high surface loading of scalants or foulant deposits before affirmative scale or fouling detection can be made. The above approaches also do not provide direct identification of the type of foulants or scalants on the heat transfer surface, nor surface imaging of the membrane surface in either in an ex-situ heat transfer cell or directly of heat transfer plant elements.

Due to at least the above described shortcomings there remains a continuing need for improved heat transfer surface monitoring systems, cells, and methods.

BRIEF SUMMARY OF THE PRESENT INVENTION

The invention is for a novel heat transfer surface monitoring (HTSM) system for direct and unambiguous detection of fouling and mineral scaling of heat transfer surfaces. Briefly, the HTSM system can be used to monitor fouling or mineral scaling in any heat transfer system. HTSM provides real-time surface images of the heat transfer surface using either visible, UV, or IR light source. Surface images are analyzed in real time to provide a range of quantitative metrics regarding the progression of fouling/scale coverage on heat transfer surfaces, identification of the class of foulant and scalants, identifying physical surface changes due to corrosion and pitting, and quantifying the changes in fouling/scaling over the operational periods of the heat exchange equipment being monitored. Quantitative output of digital or analog signals relating to the fouling/mineral/corrosion metrics can then be utilized for to guide operators of the heat exchange equipment in establishing and triggering the appropriate strategies for mitigating fouling/scaling.

For example, early detection of fouling/scaling can be used to send a signal to a plant control system (or warn plant operators) to trigger scale mitigation actions such as adjustment of feed water pH, adjustment of the chemical doses of scale inhibitors (i.e., antiscalants), dispersants, and biocide; adjustment of the operating conditions of feed pretreatment operations for removal of fouling and scaling precursors, heat transfer surface cleaning with suitable cleaning solutions, and adjustment of operating pressure or feed flow rate. The HTSM system is fully automated and can be operated as an online real-time heat exchange system monitor or in a self-standing mode for diagnostic tasks (e.g., heat transfer characterization and assessment of the efficacy of operating conditions, antiscalants and heat transfer cleaning chemicals). The present invention offers a superior approach for real-time monitoring of heat transfer surfaces that generates quantitative metrics of the type and severity of mineral scaling/fouling for heat exchange equipment to enable informative heat transfer surface monitoring and robust feedback control.

The present invention advantageously uses an edge-lit light guide and edge illuminated light source, instead of mirrors, to direct light parallel to the heat transfer plate, so that stray light from the light source is reduced in order to improve the quality of the image captured by the image capturing device. By using an edge-lit light guide and illuminated light source instead of mirrors, numerous advantageous are imparted, such as minimizing structural variation of the relative light and optical imaging components over time, and a more accurate visual and spectral data analysis of the heat transfer surface.

The present invention also introduces a unique approach whereby lighting is introduced for tubular glow conduits through the use of circumferential light guides (perpendicular to the flow direction of the water stream in the heat exchange conduit). Another arrangement of lighting is via horizontal light guides along the direction of flow at the heat exchange flow conduit. The light guides arrangements can be incorporated in the same monitoring system to allow flexibility of surface lighting for imaging of heat exchange fouling, scaling and corrosion/pitting.

In one aspect of the invention there is a heat transfer surface monitoring cell for use in monitoring scaling, fouling, pitting and corrosion of heat transfer surfaces. The cell has heat transfer plate having a first surface on a fluid inlet feed side. The cell also includes an edge-lit light guide having an aperture forming a fluid flow channel, the heat transfer plate positioned adjacent to the edge-lit light guide and overlay the aperture. The edge-lit light guide is comprised of a transparent or translucent material to illuminate the first surface of the heat transfer plate. The edge-lit light guide is connected to an edge illumination light source adjacent to the edge-lit light guide, the edge illumination light source operable to illuminate the edge lit light guide, thereby providing illumination substantially parallel to the heat transfer plate and allowing an observer to view scaling, fouling, pitting, and corrosion on the first surface of the heat transfer plate.

The cell also includes a fluid flow channel module having a fluid flow channel module support block, an optical window within the fluid flow channel support block, the optical window for viewing the heat transfer plate. The fluid flow channel includes a fluid inlet conduit for entry of a fluid stream within the fluid flow channel module and a fluid outlet conduit for exit for the fluid stream away from the fluid flow channel module.

The cell also includes a heating/cooling module capable of transferring heat to the heat transfer plate. The heating/cooling module as a heating/cooling support block and a heating/cooling element, the heating/cooling element capable of being temperature controlled. The heating/cooling support block is capable of conducting heat between the heating cooling element and the heat transfer plate.

In another aspect of the invention there is a system for use in monitoring scaling, fouling, pitting, and corrosion of a heat transfer surface. The system includes the above described HTSM cell as well as a surface imaging module having imaging components such as a camera and a lens. In some embodiments, the imaging components can use a lensless image capturing device. The surface imaging module is configured and located relative to the HTSM so as to be operable to capture at least one of an image and a reflectance spectra of the surface of the first surface of the heat transfer plate of the cell and to create at least one of an image data signal and a spectral signal indicative of the captured at least one of the image and the spectra. The heat transfer monitoring system also includes within the overall system an image processing system operatively linked to the surface imaging module so as to receive the image data signal therefrom. The image processing system analyzes the image data signal so as to provide an indication of an extent of at least one of scaling, fouling, corrosion, and pitting, on the heat transfer plate. The system also includes system controller operable to control at least of one of illumination, image capturing, spectra capturing, image data management, image analysis, external data communication, inlet flow rate, and pressure on the fluid inlet feed side to be equal to or approximately that of the heat exchange equipment being monitored.

In yet another aspect of the invention there is an HTSM cell that has a heat exchanger cylindrical tube having a viewable inner surface. The cell has a light guide for allowing light to enter from the outside of the heat exchanger cylindrical tube to illuminate the viewable inner surface. A light source is connected to the light guide for illuminating the viewable inner surface of the heat exchanger cylindrical tube. A fluid inlet conduit is positioned to allow fluid to enter within the heat exchanger cylindrical tube, and a fluid outlet conduit is positioned to allow fluid to exit the heat exchanger cylindrical tube. A surface imaging module is affixed to the heat exchanger cylindrical tube and positioned above an optical window to view the viewable inner surface of the heat exchanger cylindrical tube. In one aspect of the cell, a heating element is installed circumferentially over a segment or the entire heat exchanger tube in the HTSM cell.

In one aspect, the light guide is a side transparent window positioned at the longitudinal end of the heat exchanger cylindrical tube, and the light source is positioned adjacent the side transparent window to allow for low-angle illumination of the viewable inner surface of the tube. In another aspect, the light guide is a slit light guide incorporated within an outer circumference of the wall of the heat exchanger cylindrical tube and extends through the wall such that the slit light guide allows light to pass through to the inside of the heat exchanger cylindrical tube, to illuminate the viewable inner surface of the tube. The light source may also be positioned along the inner surface of the heat exchanger cylindrical tube.

In yet another aspect of the invention, there is a method for monitoring fouling, scaling, corrosion and pitting of a heat transfer surface. The method includes providing an HTSM cell as previously described, passing a fluid intake stream across the first surface of the heat transfer plate, collecting visual data from an illuminated portion of the first surface of the heat transfer plate, transmitting the collected visual data to an image processing system, and interpreting the collected visual data with the image processing system to determine an extent of fouling, scaling, corrosion, and pitting.

BRIEF DESCRIPTION OF THE DRAWINGS

FIG. 4b is a cross-sectional view (midsection x-z plane) of an embodiment of the heat transfer surface monitoring cell of FIG. 4a;

FIG. 4c is a cross-sectional view (midsection y-z plane) of an embodiment of the heat transfer surface monitoring cell of FIG. 4a;

DETAILED DESCRIPTION OF EMBODIMENTS

Figure 1:
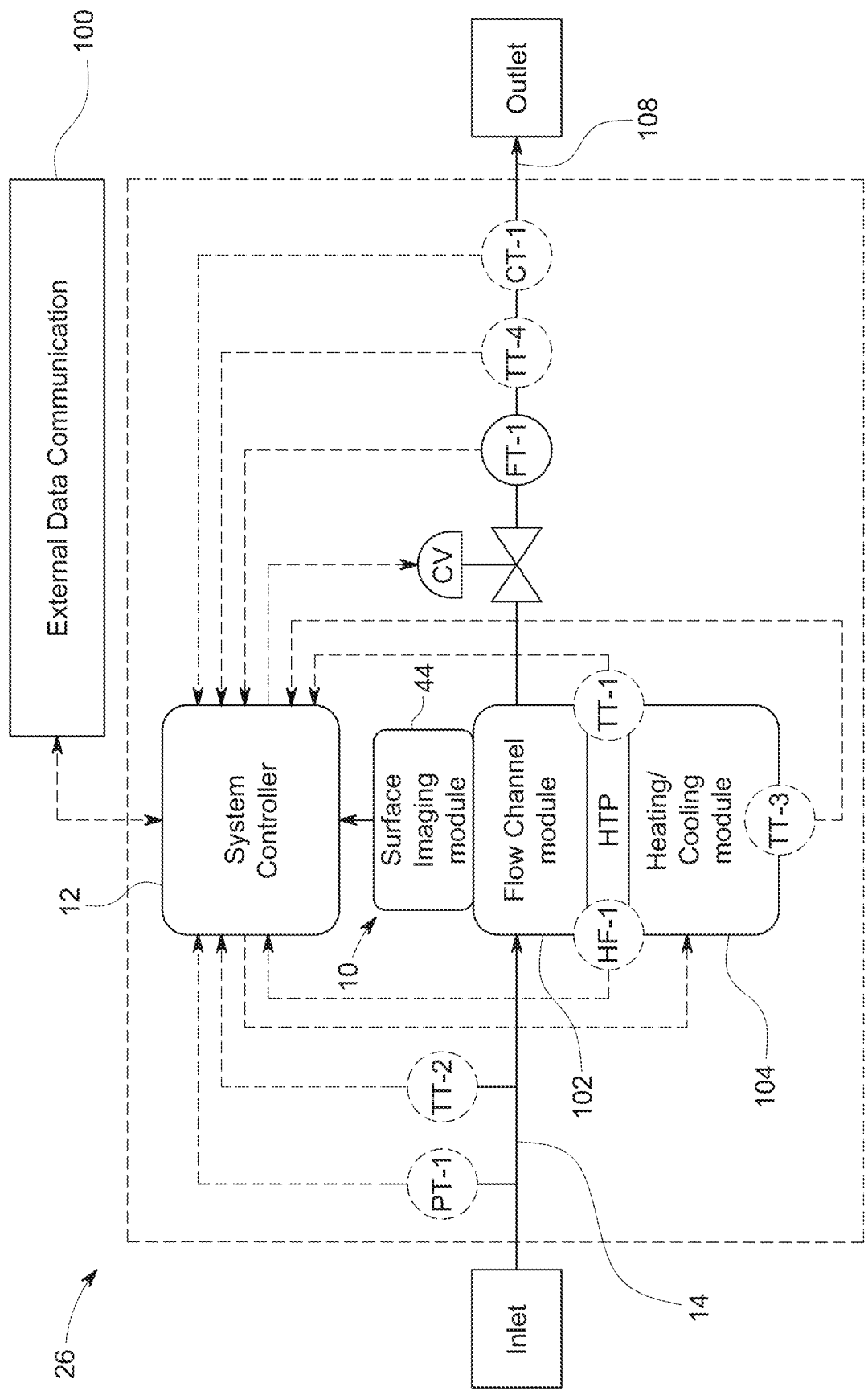
FIG. 1 is a diagrammatic view of a process schematic of a heat transfer surface monitoring surface monitoring system.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

The present invention is a heat transfer surface monitoring (HTSM) system 26 that enables real-time direct monitoring of heat transfer surfaces during heating or cooling operations. The HTSM system can serve as an ex-situ monitor for surface fouling, scaling or corrosion of a heat exchange equipment by operating the HTSM system (26) at hydrodynamic and heat transfer conditions mimicking to those of the heat exchange equipment segment being monitored (e.g., cooling water exit region of a surface condenser, which is typically a water-cooled shell and tube heat exchanger installed to condense exhaust steam from a steam turbine in thermal power stations).

Turning to the Figures, FIG. 1 depicts a schematic one embodiment of an HTSM system 26. The HTSM system 26 includes an HTSM cell 10 having a fluid flow cell module 102, a surface imaging module 44, a heating/cooling module 104, a heat transfer plate 16, which is visually-observable, a system controller 12, a temperature probe/transmitter TT-1 for the HTP 16, a flow meter FT-1, and a flow control valve CV.

The HTSM system 26 may also include feed temperature transmitter TT-2, a heat flux sensor HF-1, an inlet pressor sensor/transmitter PT-1, a heating/cooling temperature transmitter TT-3, an outlet stream temperature sensor/transmitter TT-4, and a conductivity transmitter CT-1. A pressurized inlet stream 14 is fed to the HTSM cell 10, and in the cell 10, the feed stream contacts the heat transfer plate (HTP), where heat transfer occurs at the fluid-solid interface. These sensors/transmitters are useful for real-time characterization of the heat transfer performance (i.e., heat transfer flux, heat transfer coefficient) in the HTSM cell 10.

The HTSM cell 10 integrates surface illumination and imaging components (see FIG. 4) to allow for direct real-time visualization of the heat transfer plate first surface 106 of the heat transfer plate 16. A Process/System Controller 12 controls the imaging and illumination operations in the HTSM cell 10, including illumination selection (when multiple types of light sources are utilized, i.e., visible, UV, or IR), timing, intensity, image capture triggering, image data management, image analysis, and external data communication 100. In order to regulate the fluid flow velocity through the HTSM fluid flow cell 102 to be approximately that of the heat exchange equipment segment being monitored, a control valve (CV) can be fitted at either the inlet stream 14 or outlet stream 108 of the HTSM cell 10.

A System Controller 12 provides feed-back control input to the flow rate and manipulates the control valve (CV) actuator based on the measured and set-point values of the fluid flow via a flow meter (FT-1). The HTSM system 26 utilizes a heating/cooling module 104 to control the temperature of the HTP 16. Thus, the rate of heat transfer through the HTP 16 allows the HTSM system 26 to mimic the heat transfer conditions in the heat exchange equipment segment being monitored.

Figure 2A:
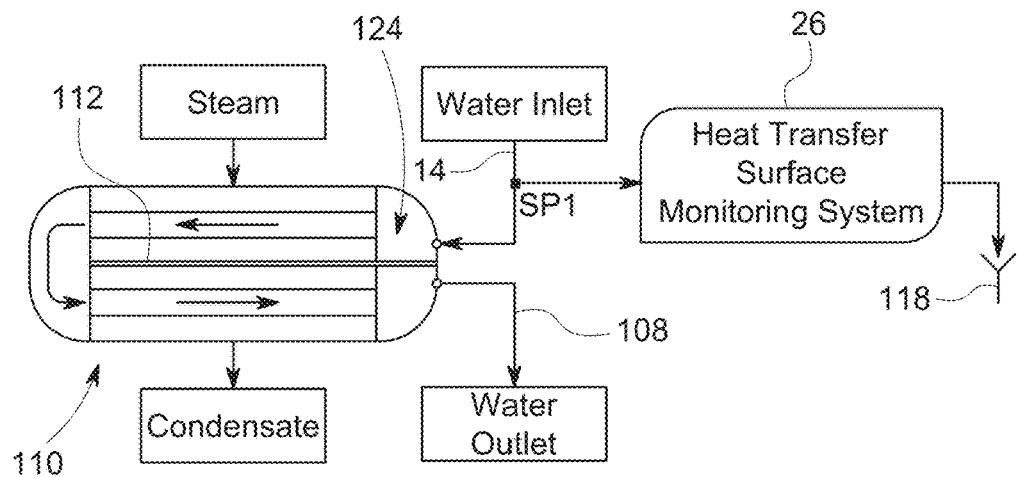
FIG. 2a is a diagrammatic view of a process schematic heat transfer surface monitoring system at the cold-side water inlet of the condenser.
Figure 2B:
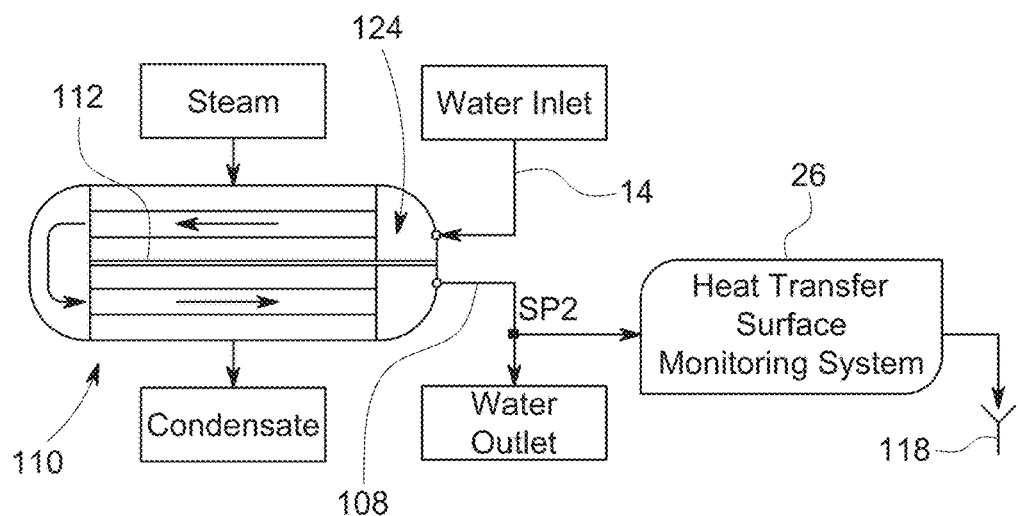
FIG. 2b is a diagrammatic view of a process schematic of heat transfer surface monitoring system at the hot-side water outlet of the condenser.
Figure 2C:
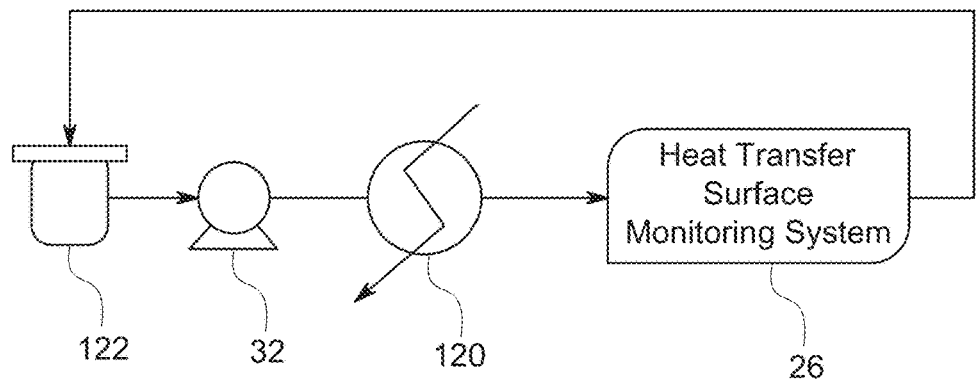
FIG. 2c is a diagrammatic view of process schematic a heat transfer surface monitoring system as a stand-alone operation.

Turning to FIGS. 2a, 2b, and 2c, the HTSM system 26 can implemented in a variety of ways. FIG. 2a and FIG. 2b depict common implementations of the HTSM system 26 for real-time monitoring of heat transfer surface fouling and/or scaling in heat exchange equipment 100, such as a monitored surface condenser 110 that has a heat transfer surface 112, as found in power plants. In each of the above two cases, the HTSM system 26 is fed with a pressurized inlet side stream 114 (i.e., with sufficiently small feed flow rates to minimize impact on the monitored heat exchange equipment operations) from the heat exchange equipment 110 monitored segment of the surface condenser 112. FIG. 2a depicts a schematic showing elements for monitoring the heat transfer surface condenser 112 fouling at the (cold-side) water inlet 14 of the condenser 110. In this embodiment, the HTSM system 26 is fed with a side stream 14 from the surface condenser 110 cooling water inlet (i.e., from sampling point 1 (SP1); FIG. 2a). The conditions within the HTSM system 26 are substantially similar to the conditions within the heat exchange equipment element segment of the surface condenser 110. Therefore, any fouling, scaling and corrosion or pitting that occurs within the HTSM system 26 are also likely to be occurring in the heat exchange equipment 110 being monitored.

To monitor fouling, scaling, pitting, and corrosion at the (hot-side) water outlet 108 of the heat exchange equipment 110 being monitored, the HTSM system 26 is fed with an outlet side stream 116 from the heat exchange equipment 100. (i.e., from sampling point 2 (SP2); FIG. 2b).

In either embodiment from FIG. 2a or FIG. 2b, the HTSM system 26 can be used to inform on the operational state of the surface condenser 112 with respect to the onset of fouling/mineral scaling or surface corrosion. This enables the heat exchange equipment operators (or automatic control systems) to appropriately adjust the surface condenser 112 operating conditions (e.g., increase fluid velocity, reduce cooling water temperature increase, adjust pH, scale/corrosion inhibitor dose chemical doses, etc.) so as to avert crippling effects of prolonged or uncontrolled heat transfer surface condenser 112 fouling/mineral scaling or corrosion conditions. The fluid, after passing through the HTSM system 26 can then be discarded, such as through a drain 118.

In addition to deployment for real-time monitoring of industrial heat exchange equipment (FIGS. 2a-b), the HTSM system 26 can also be configured as a stand-alone system operating with an external feed pump 32 and a small heat exchanger 120 connected to a tank 122 as shown in FIG. 2c. This configuration can be utilized, for example, to evaluate the fouling or mineral scaling or corrosion tendency associated with a given source water or heat exchange surface type, assess the efficacy of fouling/mineral scaling/corrosion mitigation methods (e.g., use of scale/corrosion inhibitor, pH adjustment, anodic/cathodic protection, etc.), assess feed pretreatment effectiveness, and evaluate the cycles-of-concentration limit in cooling water loop operation.

The rate of heat transfer through the HTP 16 in the HTSM cell 10, relative to that which exists in the heat exchange equipment segment 110 being monitored (e.g., see FIGS. 2a-b), can be regulated via both the heating/cooling module 104 (i.e., to control HTP 16 temperature) and the fluid flow control valve (CV) (i.e., to control fluid flow velocity parallel to the HTP 16). The driving force for fouling and mineral scaling of the first surface 106 of the HTP 16 is also governed by the HTP 16 temperature and fluid flow velocity. Thus, aspect of the present embodiments is to ensure that the fluid temperature entering the HTSM cell 10 remains the same as in the heat exchanger equipment 110 segment being monitored (i.e., by using appropriate insulators and minimizing pipe length of the side stream 114, 116). Moreover, under the conditions of hydrodynamic similarity and heat transfer similarity, fouling/mineral scaling and corrosion in the HTSM cell 10 should be representative of those occurring in the heat exchange equipment segment 110 being monitored. In the special case in which the flow channel geometry in the HTSM cell 10 is of the same or closely matches that of the monitored heat exchanger fluid channel 124 (e.g., tube) segment in the plant, the average fluid-flow velocity and/or Reynolds number can also be matched, providing both geometric and hydrodynamic similarities. Heat transfer similarity can then be attained by additionally matching the temperature of the heat transfer plate 16 of the HTSM cell 10 to be as in the heat transfer surface condenser 112 of the heat exchange equipment segment 110 being monitored.

Figure 3:
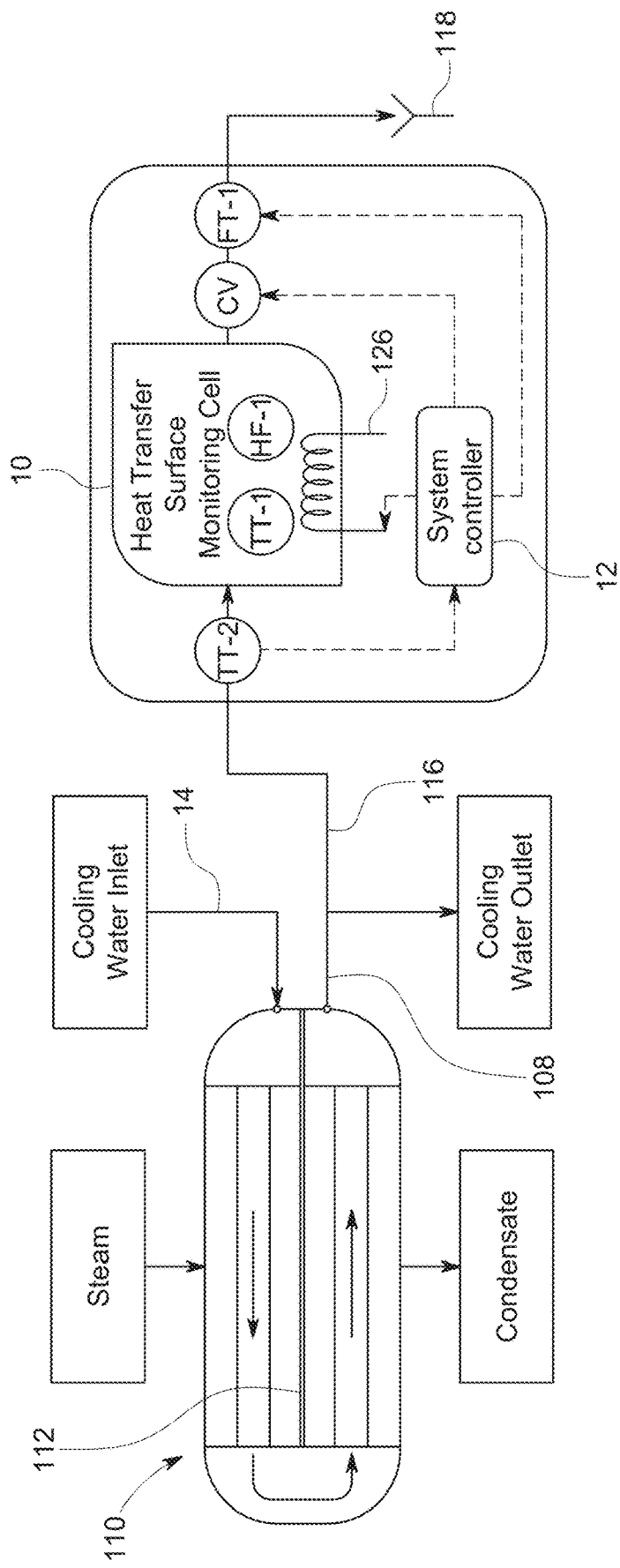
FIG. 3 is a diagrammatic view of a process schematic of a heat transfer surface monitoring system implemented to monitor fouling at the cooling water outlet of a surface condenser.

Turning to FIG. 3, the HTSM system 26 is shown for monitoring fouling at the exit of the (hot-side) cooling water outlet 108 in a heat exchanger equipment 100 segment, such as what is found in a power plant surface condenser (i.e., same as the configuration in FIG. 2b). The HTSM system 26 is fed with the cooling water taken from the cooling water outlet 108 of the condenser 110 via an outlet side stream conduit 116. The cooling water enters the HTSM cell 10 at a temperature as measured before entry into the HTSM cell 10. In the HTSM cell 10, the cooling water feed flows over a heat transfer plate 16 (which can be flat or curved) of the same metallurgy as the surface condenser 112 (e.g., heat exchanger tubes), is heated to a given temperature relative to the heat exchanger surface segment being monitored (in this case, cooling water outlet segment 108). Heat transfer plate 16 (as shown in more detail in FIGS. 4a-4c) heating is accomplished by a heating/cooling element 126, controlled by the HTSM system controller 12, based on the heat transfer plate 16 temperature. Heat flux through the heat transfer plate 16 can be measured using a suitable heat flux sensor (HF-1). The HTSM system 26 is fitted with a control valve (CV) in order to regulate the flow rate (as measured by a flow meter FT-1) into the HTSM cell 10, controlled by the controller 12. In one embodiment, the flow rate through the side stream conduit 116 is significantly smaller than the overall flow rate in the cooling water outlet stream 108 of the condenser 110. The outlet flow from the HTSM system 26 is not returned to the cooling water stream 14 of the condenser 110, but it is discharged via a line into a drain 118 or directed to the appropriate location in the plant as desired. It is important that the temperature of the incoming cooling water is not altered as it flows into the HTSM cell 10 (as measured by a temperature sensor TT-1) and thus heat loss are minimized by setting the optimal conduit length and proper insulation on the outlet side stream 116.

Heat Transfer Surface Monitoring Cell

Figure 4A:
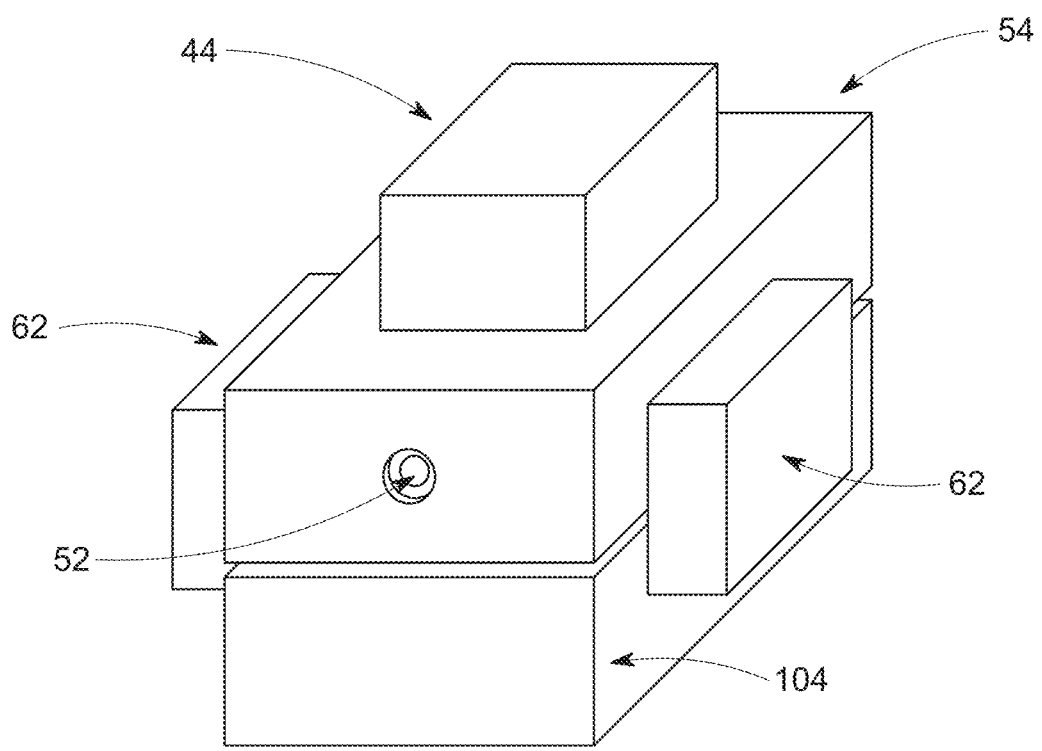
FIG. 4a is a perspective view of an embodiment of a heat transfer surface monitoring cell.
Figure 4B:
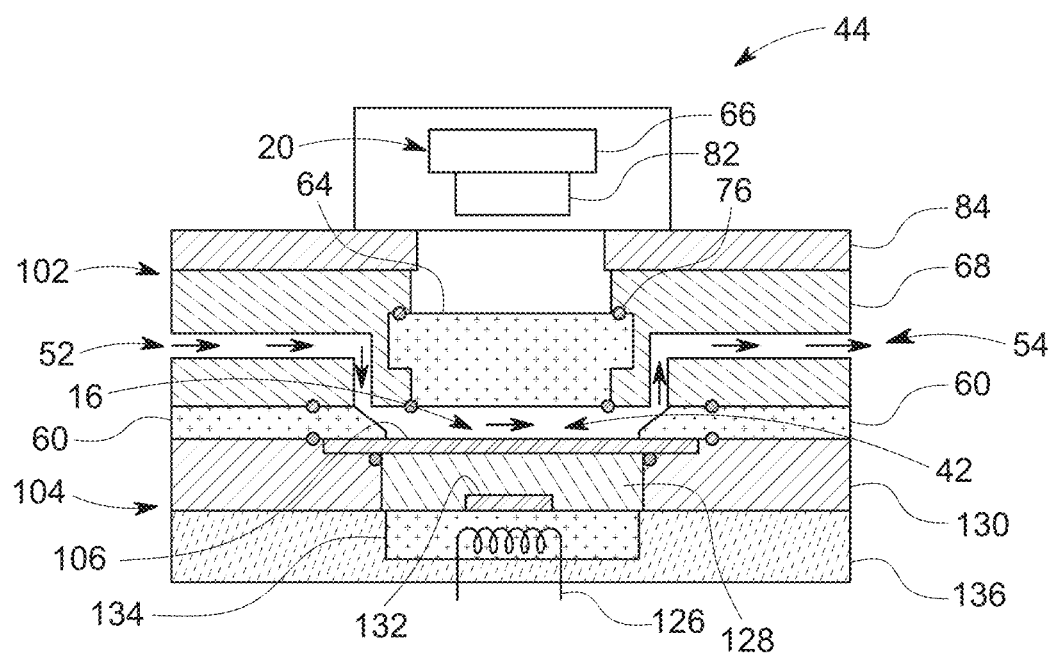
Figure 4C:
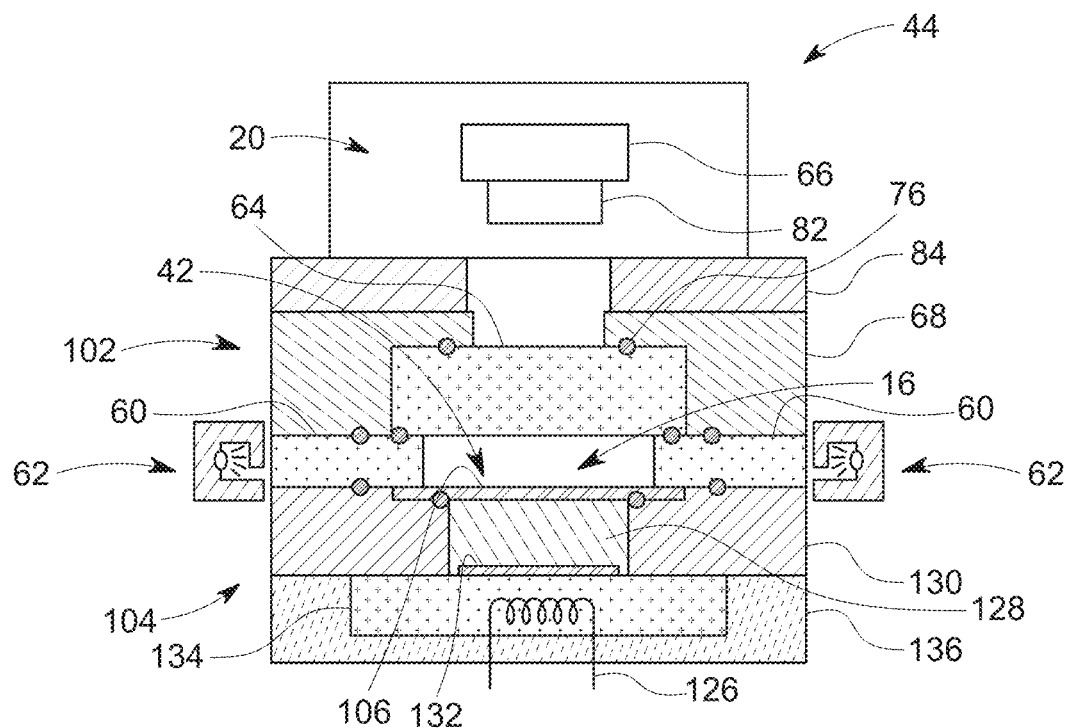

Turning to FIGS. 4a-4c, a central component of the present invention is the heat transfer surface monitoring (HTSM) cell 10. In one embodiment, the HTSM 10 cell combines four modules (FIG. 4a): a) surface imaging module 44, b) a fluid flow-channel module 102, c) heating/cooling module 104, and d) an edge illumination/light source 62.

As shown in FIG. 4a-c, feed fluid flows through an inlet conduit 52 of a fluid flow channel module support block 68 into the flow channel 42, contacts with a first surface 106 heat transfer plate 16 in the heating/cooling module 104 and exits through the outlet conduit 54 of the fluid flow channel module support block 68. A transparent edge-lit light guide 60 serves to both form the flow-channel 42 structure and enable side illumination parallel to the first surface of the heat transfer plate 106 using an edge illumination/light source 62. The edge-lit light guide 62 can be made of essentially any desired thickness to set the desired fluid flow channel height to any predetermined dimension. The fluid channel is therefore capable of being adjusted to have any number of predetermined dimensions by adjusting the dimensions of the edge-lit light guide, such as height and width. A transparent section acts as an optical window 64 in the fluid flow channel module 102, which allows for direct, real-time visualization of the first surface of the heat transfer plate 106 using imaging components 20 such as a CCD camera 66 and a lens 82 in the surface imaging module 44. Any light source of sufficient intensity can be utilized for edge illumination, ranging from, for example, visible-light LEDs to LEDs of various wavelengths (e.g., specific visible color range(s), ultraviolet, infrared). Any imaging unit (camera-lens, lensless camera, image sensors) in the surface imaging module 44 can be utilized, ranging from macro-imaging, high magnification optical microscopy, to spectroscopic imaging (e.g., ultraviolet, visible, infrared) and lensless image sensors. In one embodiment, the surface imaging module 44 has a CCD camera 66 and lenses 82 that are capable viewing and imaging the first surface of the heat transfer plate 106. A metal clamp 84 serves to hold down the fluid flow channel module 102 on top of the heating/cooling module 104. The heating/cooling module 104 contains components designed to bring and maintain the heat transfer plate 16 to the target temperature using a heating/cooling element 126. Specifically, the heat transfer plate 16 is placed in thermal contact (e.g., via an appropriate thin layer of thermal paste) on a heat-conducting heat transfer medium 128, supported by an opaque heating/cooling support block 130 made of materials with low heat conductivity. A combination heat flux-temperature sensor 132 is provided at the bottom of the heat transfer medium 128 in order to measure the heat flux through the heat transfer plate 16 and the heat transfer medium 128, as well as monitor the temperature of the heat transfer plate 16 and the heat transfer medium 128. The heat transfer medium 128 is heated/cooled by a heating/cooling plate 134 and its associate heating/cooling element 126, both of which are covered with an appropriate heat insulator 136.

As fluid passes over the flow channel 42, the fluid may foul, scale, pit, and/or corrode the heat transfer plate 16 that come into contact with the fluid. Fouling or scaling of the heat transfer surface in the monitoring system and other surface changes due to corrosion/pitting of the heat transfer plate surface 16 can be viewed by surface imaging module 44 due to the illumination of the first surface of the heat transfer plate 106 by the light source 62, as described in further detailed in the following section.

Figure 11:
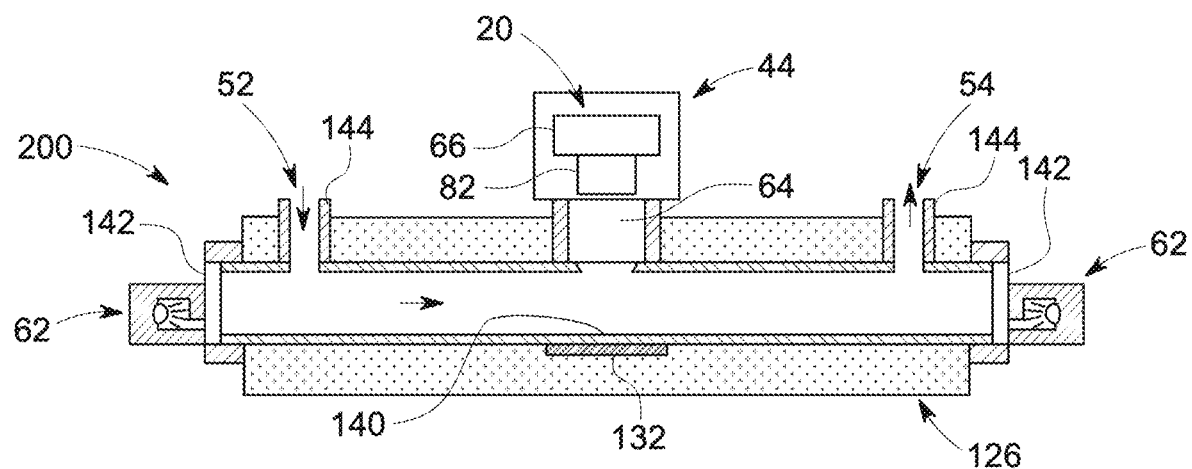
FIG. 11 is a cross-sectional view of an embodiment of an HTSM cell in a heat exchanger cylindrical tube having side-lit illumination.

As shown in FIGS. 4a-4c, the HTSM cell 10 can use a rectangularly shaped flow channel that uses a rectangularly shaped heat transfer plate 16. However, one may envision other shapes of flow channels that do not detract from the spirit of the invention. For example, in FIGS. 11-14 a cylindrical HTSM cell (i.e. a heat exchanger cylindrical tube segment 200) is illustrated which uses a heat exchange cylindrical tube 200. In this case, the same type (geometry and metallurgy) of a heat exchange cylindrical tube 200 segment is used as in the heat exchange system 110 being monitored, thereby allowing the heat exchanger tube segment 200 to mimic the heat exchanger system 110 being monitored. As shown in FIG. 11, the cylindrical tube 200 can be fitted with a fluid inlet conduit 52 and fluid outlet conduit 54 forming an inlet and outlet ports 144 to enable cooling water inflow and outflow of the tube cell 200. At a point between the inlet and outlet ports 52, 54 a transparent window 64 can be fitted to enable imaging via an imaging module 44 of a portion of a viewable inner surface of the tube 140 for real-time fouling/scaling/corrosion detection and monitoring.

Surface Illumination and Light Guide

The main principle for enhanced surface imaging in a heat transfer surface monitoring system extends a previously developed method for real-time monitoring of reverse osmosis (RO) membrane surface in International Application No. PCT/US2018/028823, to Rahardianto and Bilal, incorporated herein by reference in its entirety for all purposes.

The method relies on specialized illumination that directs a light path to be just above the first surface 106 of the heat transfer plate 16, but at, or nearly (i.e., low angle) parallel orientation. Using this approach, any object forming on the first surface 106 protrudes into the light path, leading to light scattering toward the camera (viewed through the optical window 64 above the heat transfer plate 16, such that a high contrast (between the objects 85 on the heat transfer plate 16, and the heat transfer surface 106 background) image can be captured. The objects 85 can be scaling or fouling, but the imaging can also view surface changes in the heat transfer plate due to pitting and corrosion. This illumination technique is commonly known as low-angle or dark-field illumination, which is typically utilized to enhance the contrast between an object and the background surface. In applying this illumination technique for real-time heat transfer surface monitoring during heating/cooling operation, the major technical challenge is how to provide parallel/low-angle illumination above a heat/transfer surface operating under pressurized heating/cooling conditions.

Figure 5:
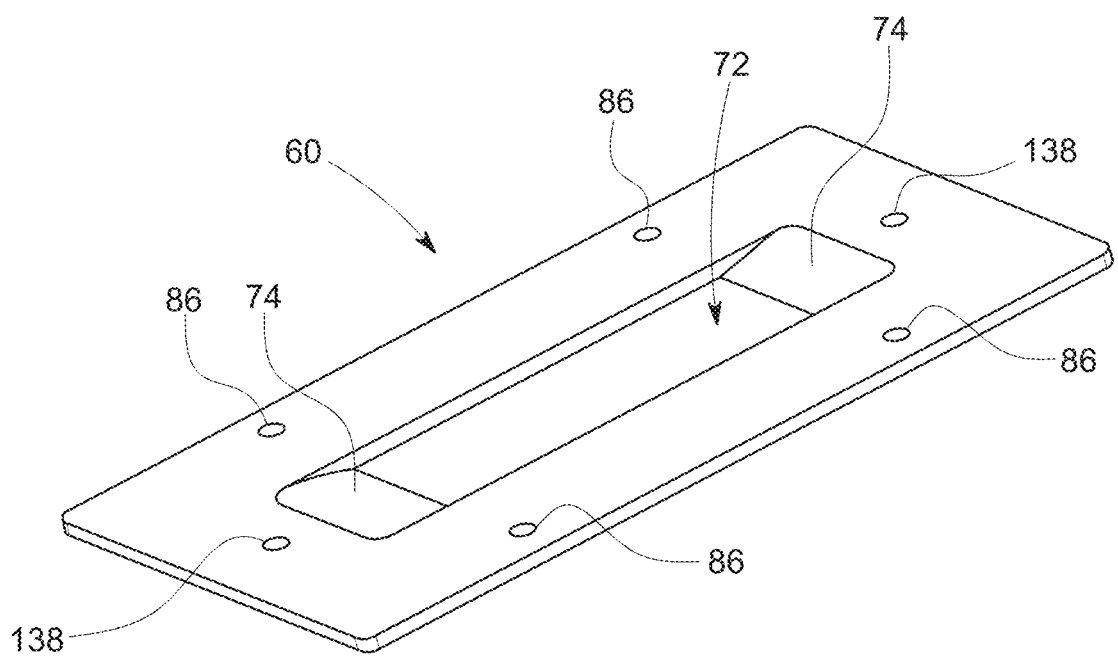
FIG. 5 is an embodiment of an edge-lit light guide.
Figure 6:
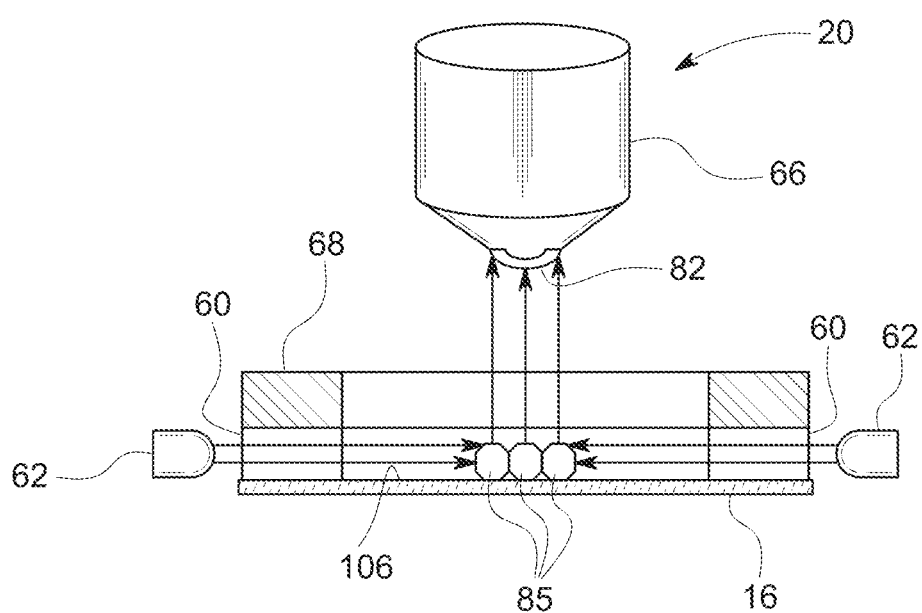
FIG. 6 is a semi-schematic view of a heat transfer surface monitoring cell showing the direction of light across the monitoring surface.

In the present invention, the solution to the illumination challenge is to utilize a transparent edge-lit light guide 60 (see FIG. 5 and FIG. 6) clamped down between opaque support blocks 68, 130. An edge-lit light guide aperture (opening) 72 in the middle of the light guide 60 forms the fluid flow channel 42, which can be formed with a customized channel thickness so as to meet the desired hydrodynamic Reynolds number similarity to the heat exchanger equipment 110 being monitored. Flow disturbance at the inlet/outlet conduit regions 52, 54 can be minimized by constructing tapered surfaces or gradients 74 within the light guide 60. The functions of the transparent edge-lit light guide 60 include: a) forming the fluid flow channel 42 structure to isolate the pressurized fluid in the fluid-flow channel 42 and, with appropriate seals 76, prevent leakage, b) clampdown of the heat transfer plate 16 so it is affixed above the heat transfer medium 128, c) holding the opaque support block 68 that also act as a frame for the optical window 64, and d) enabling effective transmission of light using direct (i.e., without mirror reflection) edge illumination/light source 62 to illuminate the fluid flow channel 42.

The light guide 60, in combination with opaque support structure 68; ensures that light paths are at or near parallel orientation with respect to the surface of the heat transfer plate 16, thereby minimizing stray light and maximizing contrast between objects 85 on the first surface of the heat transfer plate 106, and the background heat transfer surface. Minimizing light paths that are perpendicular to the heat transfer surface 106 (i.e., stray light) in areas that are not covered by surface objects (i.e., clean area of the heat transfer plate 16) is critical to ensure enhanced imaging and good contrast between surface objects 85 (especially transparent objects) and the heat transfer surface 106. It is also important to have even illumination with minimal post-assembly setup. Although the light guide 60 can be made of any transparent material, given available components in the market today, plastic edge-lit light guide 60 made from acrylic, formulated with dispersed light-diffusing particles (such as Lucitelux LGP or Acrylite Endlighten) is currently preferable as it best provides even illumination throughout the entire flow channel 42 with minimal adjustment of the edge illumination/light source 62 orientation. Light guide bolt holes 86 are provided to allow clamping of the fluid flow channel module 102 and the heating/cooling module 104. Light guide alignment holes 138 are provided for aligning the light guide 60 with the fluid flow channel module 102 and the heating/cooling module 104 using connecting members such as dowel pins.

In the embodiment shown in FIG. 11, the light sources 62 are outside of side two transparent windows 142 for low angle illumination of the viewable surface of the inner tube 140. These light sources 62 are fitted at both ends of the tube cell 200 to enable low-angle illumination of the viewable inner surface of the tube 140 in order to enhance contrast between the inner surface of the tube 140 and surface deposits or pitting. In this embodiment, the viewable inner surface of the tube 140 mimics the surfaces within the heat exchange system 110 without the need for an additional heat transfer plate 16 (such as the heat transfer plate 16 shown in FIGS. 4b, 4c, 7), since the heat exchanger cylindrical tube 200 mimics the environment of the heat exchanger equipment 110 being monitored. In one aspect of the cell, a heating/cooling element 126 is installed circumferentially over a segment or the entire heat exchanger cylindrical tube 200 which provides additional control over the heat transfer environment in the heat exchanger cylindrical tube 200. Other embodiments that do not use a separate heat transfer plate 16, are shown in FIGS. 12-14.

Figure 12:
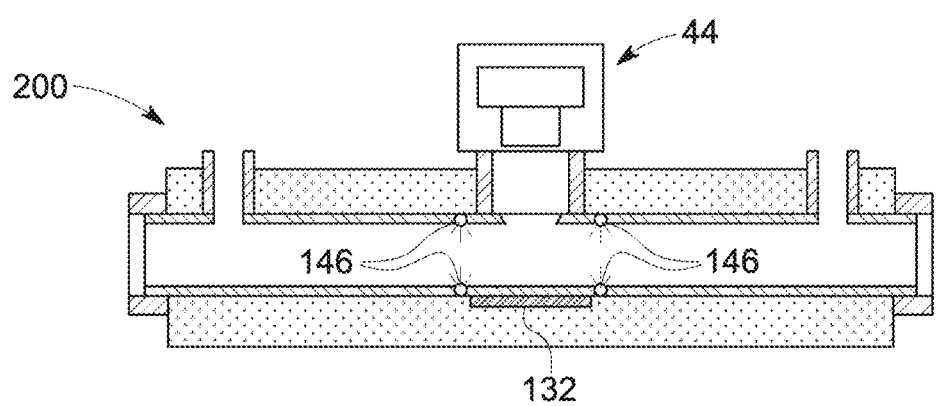
FIG. 12 is a cross-sectional view of an embodiment of an HTSM cell in a heat exchanger cylindrical tube having surface light guides placed into the wall of the heat exchanger tubes.
Figure 13:
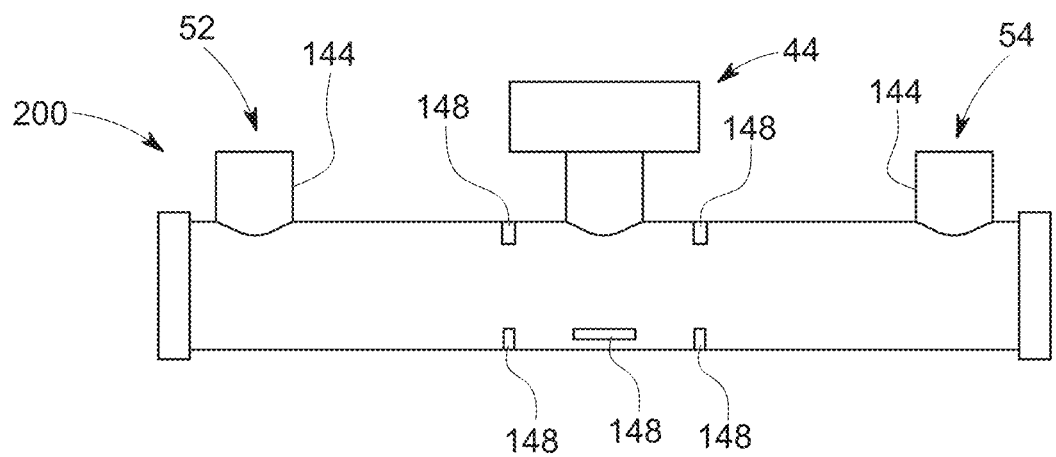
FIG. 13 is a side view of a cylindrical tube embodiment of the HTSM cell in FIG. 12.
Figure 14:
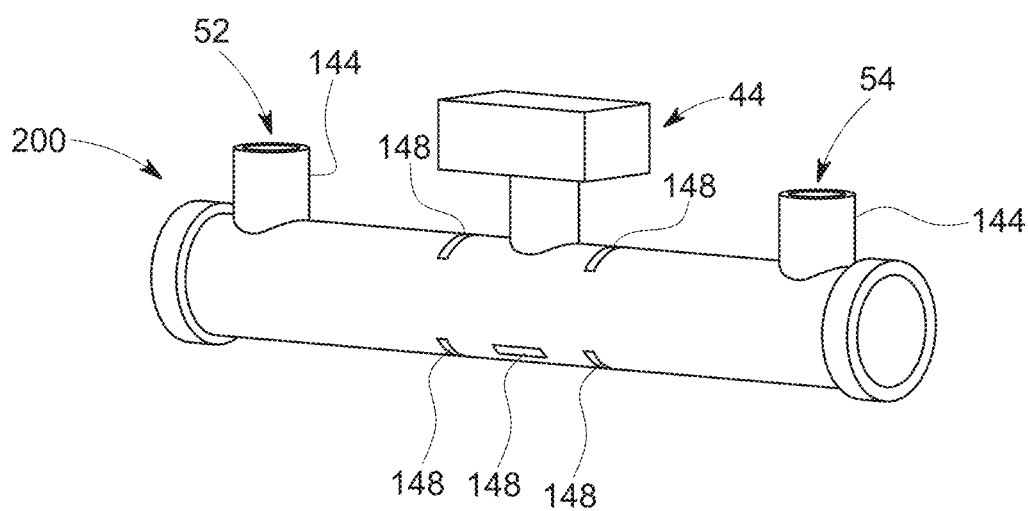
FIG. 14 is a perspective view of the cylindrical tube embodiment of the HTSM cell of FIG. 12.

In particular, in FIGS. 12-14, the HTSM configuration is where the light source is a horizontal or circumferential light source 146, positioned at slits 148 immediately above or in proximity of the monitored inner surface of the tube 140. These light sources 146 can be placed into the walls of the heat exchange tubes 200, as shown in FIG. 12. The positioning of the illumination regions can either be along any section of the circumference of the tube 200 above the monitored surface area as shown at the bottom of the tube section in FIG. 12. In contrast to the embodiments shown in FIGS. 4, 6, and 7, where the light guides are edge-lit light guides, in FIG. 12, the light guides are shown as slit light guides 148 in FIGS. 13 and 14. These slit light guides 148 can be positioned in any desired section along the tube 200 as shown, and in contrast to the embodiments of FIGS. 4a-c, and 7, the slit light guides 148 do not form a flow channel. Rather, the slit light guides 148 are integrated within the tube 200 wall, where a light source 146, such as an LED, can be attached. The slit light guides 148 can be incorporated within the outer circumference of a wall of the heat exchanger cylindrical tube 200 and extend into the inner circumference of the heat exchanger cylindrical tube 200. This allows light to illuminate the viewable inner surface. The flow in and out of the tube 200 can be via the approaches as described in the paragraphs above.

In order to maintain the tube skin at the desired temperature, the heat exchanger cylindrical tube 200 is encapsulated in a heating/cooling element 126 (e.g. water jacket, flexible heating element, etc.). The heating/cooling element 126, here, and throughout the specification, may be an element that only is capable of heating, or may be an element that is capable of both heating and cooling the adjoining structures. A heat flux and/or temperature sensor 132, can be placed at the tube portion directly across the viewable inner surface of the tube 140, which can be utilized to measure the heat exchanger cylindrical tube 200 temperature and heat flux.

It is noted that flow in and out of the tube can be either as shown in FIGS. 11-14 or where the inlet/outlet conduit ports 52, 54 are removed, the flow is directly through the tube 200 openings from left to right. Also, in addition to direct surface imaging through a transparent window, a fiberoptic imaging system may also be utilized to image the viewable inner surface of the tube 140.

Cell Assembly

Figure 7:
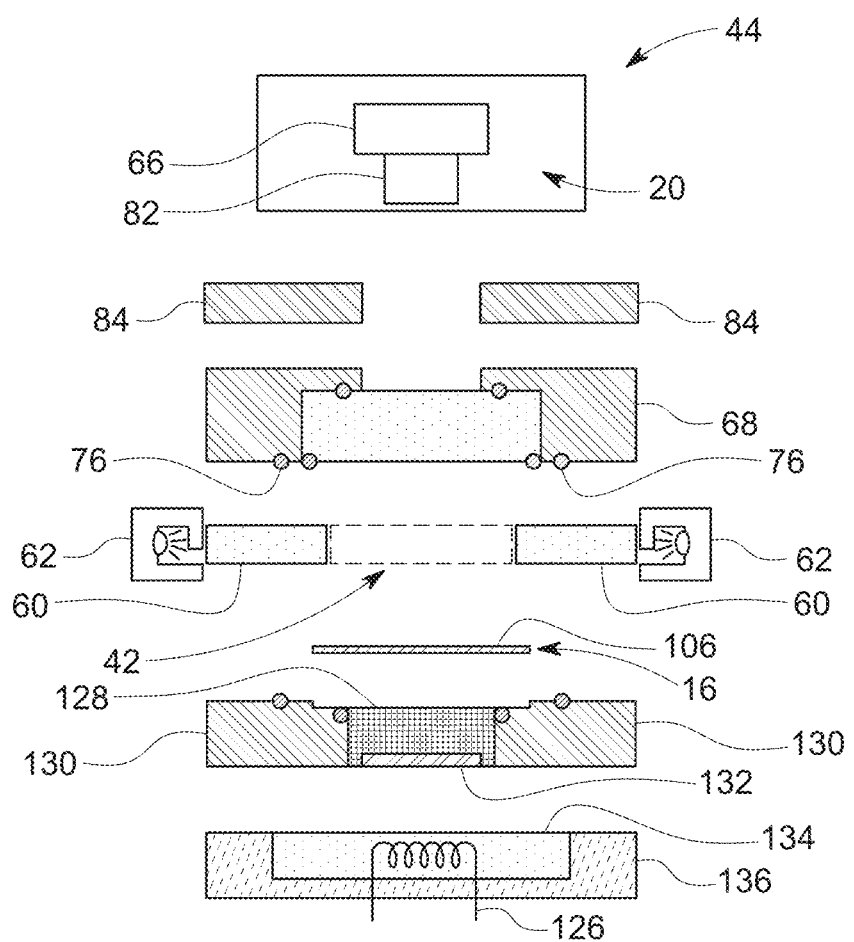
FIG. 7 is an exploded cross-sectional view (midsection y-z plane) of a heat transfer surface monitoring cell.
Figure 8:
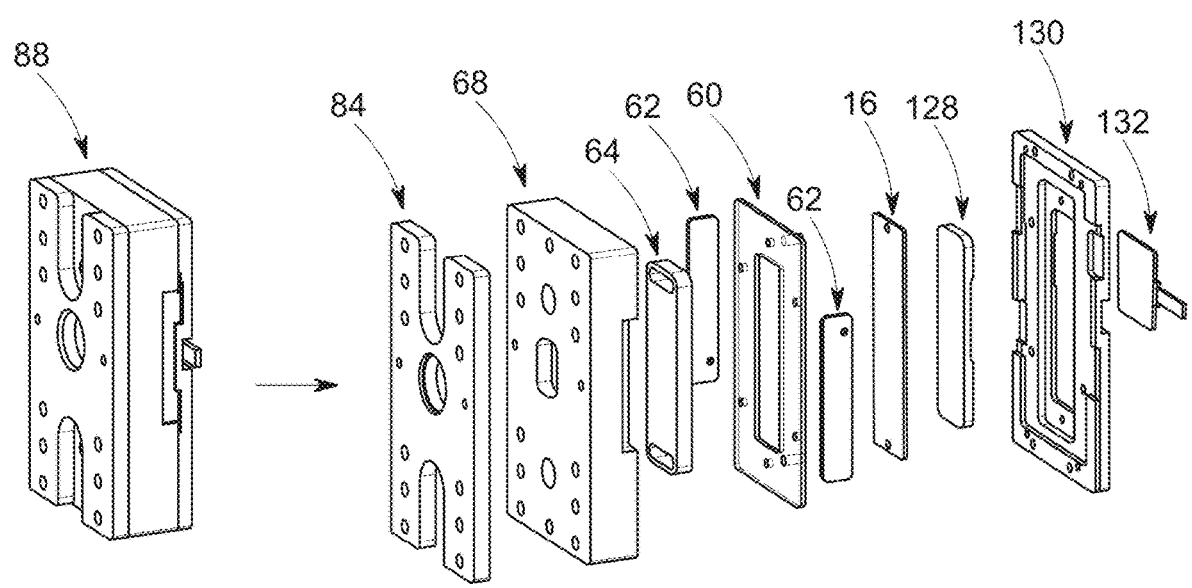
FIG. 8 is an exploded perspective view of an embodiment of a heat transfer surface monitoring cell.

An example of the embodiment of the heat transfer surface monitoring (HTSM) cell 10 is shown in cross section in FIG. 7, which is an exploded view of FIG. 4c. In this configuration, the three separate modules are integrated and form one complete unit. In FIG. 8, the HTSM cell 10 is a unit that is built as a cassette 88, which can be a removable cassette 88, that can be easily removed and replaced without affecting the positioning of the illumination system light source 62 or the surface imaging module 44.

Image Analysis

Examples of surface images from the HTSM cell 10. For the case of HTSM operation at a low and decreasing flow rate leads to increased material deposition on a heat transfer surface, as shown in FIG. 11a, with deposits increasing from Day 0, to Day 3, to Day 6. In FIG. 11a, the plate was made of admiralty bras, the plate temperature was 95° F. and the average flow velocity decreased from 7 ft/s to 1.5 ft/s (approximately 2.13 m/s to 0.46 m/s). In FIG. 11b, the heat transfer plate 16 was made of titanium, the plate temperature was 115° F. (46° C.), and the average flow velocity decreased from 3 ft/s to 0.75 ft/sec (approximately 0.91 m/s to 0.3 m/s). As can be seen from the images, when the heat transfer material was changed from admiralty brass to titanium, and the flow velocity was further decreased, large deposits formed on the surface of the heat transfer plate. The above experiment reveals that composition of heat transfer plates and conditions of the fluid environment lead to significant differences in fouling of heat transfer surfaces.

This is why it is imperative to have a system that can detect in real-time heat transfer surface condition of heat exchange equipment.

An important aspect of the present invention is real-time analysis of surface images in order to assess the extent of fouling in real time. Extending the approach utilized for surface monitoring of reverse osmosis membranes to heat transfer surfaces, a video streaming data acquisition module is interfaced with the HTSM (FIG. 4) to connect with a web-based visualization and storage platform for real time surface analysis. The module is controlled via its software component that acquires high quality data for object detection, recognition and quantification of various surface metrics using advanced image analysis software.

Figure 10:
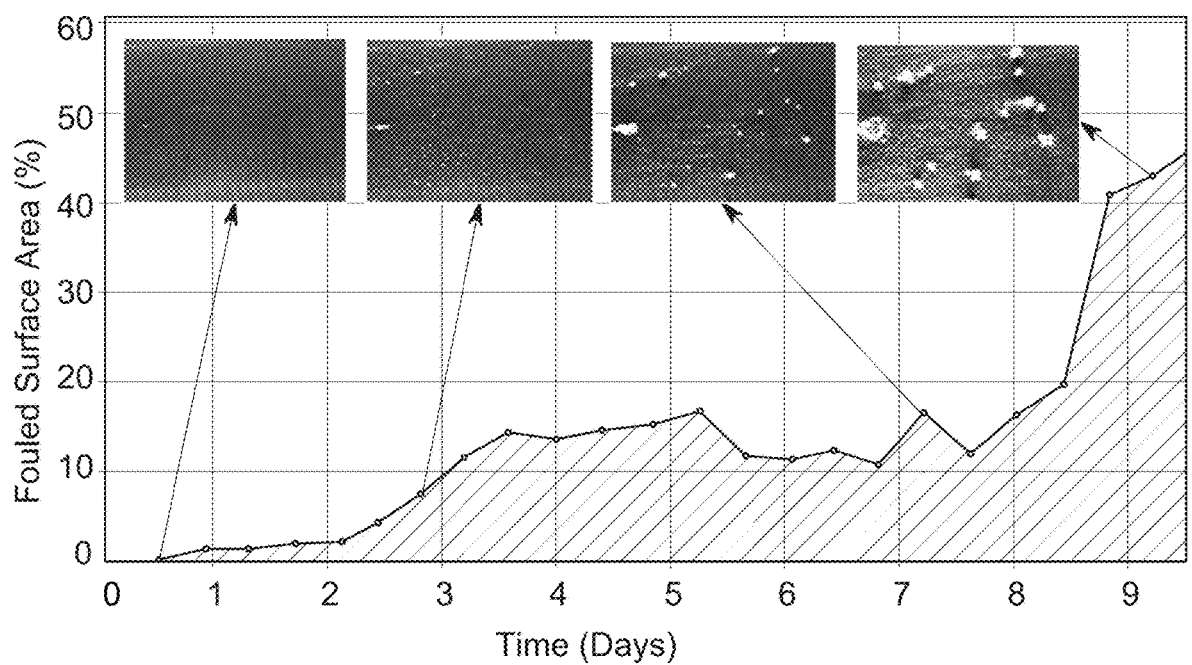
FIG. 10 is a graph showing percent fouling of a heat transfer surface over time.

The image analysis software utilizes an array of computer vision algorithms and statistical methods to detect heat transfer surface scaling and fouling as a function of time based on various surface features/metrics. The features that are used to detect the existence and type of surface scaling include object size distribution, shapes, texture, intensity (at pixel level), regional gradients, and geometry (e.g., circularity, convexity, shape identification using corner detection). As an example of the approach, for mineral scale detection, the initial state of the (clean) heat transfer surface is trained with previously captured data of known characteristics. A set of regional heuristics are trained in this module based on the intensities, local pixel neighborhood and gradients to arrive at a statistical model of the background. The trained model then periodically segments the regions where fouling/scaling occurred using its learned heuristics to determine foreground masks as detected changes. Detection is further refined using several morphological and normalization operations such as histogram equalization, image opening and dilation to remove unwanted noise and isolate loosely connected components in the image. The streaming data acquisition and analysis modules are integrated with the hardware and other process control modules of the software. An illustration of real-time determination of the extent of fouling is depicted in FIG. 10 in terms of the progression of percent fouled surface in the HTSM viewable area of the heat transfer surface.

Figure 9:
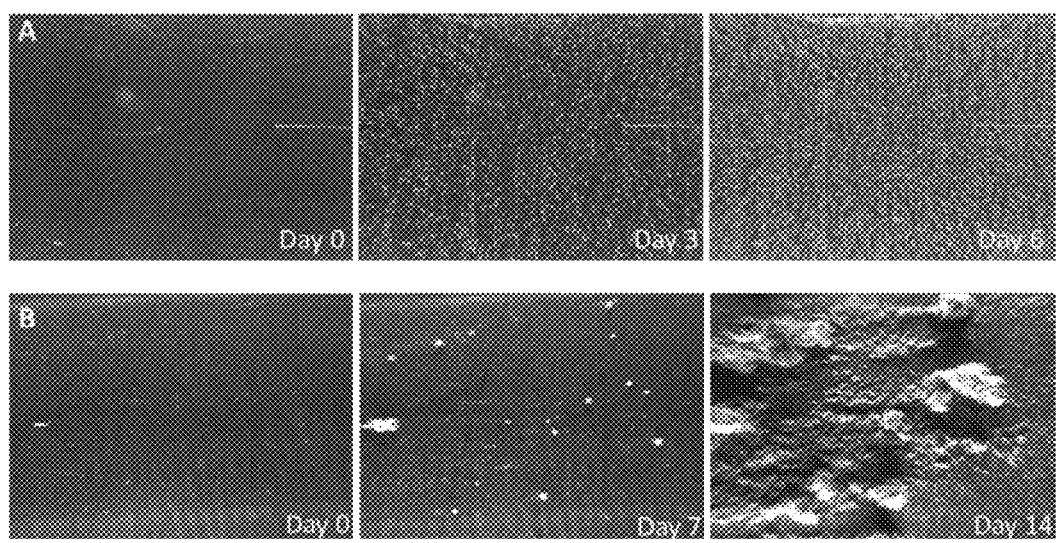
FIG. 9 are images depicting progression of fouling of an admiralty brass and titanium heat transfers surfaced exposed to water from a power plant surface condenser.

In addition to automated detection of surface foulant deposition (e.g., as shown in FIG. 9) and various types of surface fouling (e.g., particles, organics and biofoulants), a deep-learning engine is embedded for online image analysis using advanced pattern recognition techniques. The engine is trained using a large customized set of learnable filters and provides the capability to automatically produce annotations (labels for objects) along with their confidence scores (i.e., the probabilities the detected object belongs to a certain type/class of foulants/scalants. The capability of quantifying surface mineral scale/fouling as a function of time (e.g., FIG. 9 and FIG. 10), using the advanced computer vision algorithms and storing object characteristics, is accomplished using the auto-scaled time-series database system. The imaged surface characteristics are acquired in real time and stored both locally and in a remote storage system allowing real-time analysis, automated trigger generation when critical levels of foulant deposition, scaling or corrosion/pitting are reached and for dynamic system report generation. In conjunction with foulant/scale/corrosion detection and deep learning modules, the advanced online platform support automated recognition of the types, size, geometry, shape, density, and extent of surface foulants and their extent of surface coverage (e.g., FIG. 9). Using the above information, system specifications, and dynamic reporting, decision-support processes can be used to identify critical actions to optimize process control and adjust heating/cooling operating conditions of the heat exchange equipment and trigger necessary mitigation strategies by responding to the recognition of the various types and extent of fouling, scaling, corrosion and pitting of monitored surfaces.

REFERENCE NUMBERS

The following reference numbers are used throughout FIGS. 1-10:
- 10 Heat transfer surface monitoring cell
- 12 System controller
- 14 Inlet stream
- 16 Visually-observable heat transfer plate
- 20 Imaging components
- 26 Heat transfer surface monitoring system
- 32 Pump
- 42 Fluid flow channel
- 44 Surface imaging module
- 52 Fluid inlet conduit/port
- 54 Fluid outlet conduit/port
- 60 Edge-lit light guide
- 62 Edge illumination light source
- 64 Optical window
- 66 Camera lens unit
- 68 Fluid flow channel support block
- 72 Edge-lit light guide aperture
- 74 Edge-lit light guide gradients
- 76 Seals
- 82 Lens
- 84 Clamp
- 85 Objects
- 86 Light guide bolt holes
- 88 Cassette
- 100 External data communication
- 102 Fluid flow channel module
- 104 Heating/cooling module
- 106 First surface of heat transfer plate
- 108 Fluid outlet stream
- 110 Heat exchange equipment
- 112 Surface condenser of the heat exchange equipment
- 114 Inlet side stream
- 116 Outlet side stream
- 118 Drain
- 120 Heat exchanger
- 122 Tank
- 124 Heat exchanger fluid channel
- 126 Heating/cooling element
- 128 Heat transfer medium
- 130 Heating/cooling support block
- 132 Heat flux temperature sensor
- 134 Heating/cooling plate
- 136 Insulator
- 138 Light guide alignment holes
- 140 Viewable inner surface of tube
- 142 Side transparent windows
- 144 Inlet/Outlet ports
- 146 Horizontal or circumferential light source
- 148 Slit light guide
- 200 Heat exchanger cylindrical tube
- CV Control Valve
- FT-1 Flow meter
- HF-1 Heat-flux sensor
- PT-1 Inlet pressure sensor/transmitter
- SP1 Sampling point 1
- SP2 Sampling point 2
- TT-1 Temperature probe/transmitter TT-2 Feed-temperature transmitter
TT-3 Heating/cooling temperature transmitter
TT-4 Outlet stream temperature sensor/transmitter
CT-1 Conductivity transmitter While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A heat transfer surface monitoring (HTSM) cell (10) for use in monitoring scaling, fouling, pitting, and corrosion, of a heat transfer surface, the HTSM cell comprising:
   a) a heat transfer plate (16) having a first surface (106) on a fluid inlet feed side;
   b) an edge-lit light guide (60) having an aperture (72) forming a fluid flow channel (42), the heat transfer plate (16) positioned adjacent to the edge-lit light guide (60) and overlay the aperture (72), wherein the edge-lit light guide (60) is comprised of a transparent or translucent material to illuminate the first surface (106) of the heat transfer plate (16);
   c) an edge illumination light source (62) adjacent to the edge-lit light guide (60), the edge illumination light source (62) operable to illuminate the edge-lit light guide (60), thereby providing illumination substantially parallel to the heat transfer plate (16) and allowing an observer to view scaling, fouling, pitting, and corrosion on the first surface (106) of the heat transfer plate (16);
   d) a fluid flow channel module (102) having:
      i) a fluid flow channel module support block (68),
      ii) an optical window (64) within the fluid flow channel support block (68), the optical window (64) operable to view the heat transfer plate (16),
      iii) a fluid inlet conduit (52) operable to allow entry of a fluid stream within the fluid flow channel module (102),
      iv) a fluid outlet conduit (54) operable to allow exit of the fluid stream away from the fluid flow channel module (102); and,
   e) a heating/cooling module (104) capable of transferring heat to the heat transfer plate (16), the heating/cooling (104) module having:
      i) a heating/cooling support block (130),
      ii) a heating/cooling element (126), the heating/cooling element (126) capable of being temperature controlled,
         wherein the heating/cooling support block (130) is capable of conducting heat between the heating/cooling element (126) and the heat transfer plate (16).

2. The HTSM cell (10) of claim 1,
   wherein the fluid flow channel module support block (68) is characterized as having an opaque region, thereby minimizing image distortion due to stray light,
   wherein the optical window (64) is a transparent optical window; and,
   wherein the fluid inlet conduit (52) and fluid outlet conduit (54) are integrated within the fluid flow channel module.

3. The HTSM cell (10) of claim 1,
   wherein the edge-lit light guide (60) is positioned between the fluid flow channel module (102) and the heating/cooling module (104).

4. The HTSM cell (10) of claim 1 further comprising a plurality of seals (76), the plurality of seals (76) positioned between at least one of:
   a) the optical window (64) and the fluid flow channel module support block (68),
   b) the fluid flow channel support block (68) and the edge-lit light guide (60), and;
   c) the edge-lit light guide (60), the heat transfer plate (16), a heat transfer medium (128), and the heating/cooling support block (130).

5. The HTSM cell (10) of claim 1, wherein the edge-lit light guide (60) is positioned such that the aperture (72) of the edge-lit light guide (60) forms a fluid flow channel (42) between the fluid inlet conduit (52) and the fluid outlet conduit (54), thereby allowing fluid to pass over the heat transfer plate (16).

6. The HTSM cell (10) of claim 1, wherein the fluid flow channel (42) has a height and a width, wherein the height the width of the fluid flow channel (42) is capable of being adjusted by having a light guide (60) of predetermined dimensions to form a desired fluid flow channel (42) height and width.

7. The HTSM cell (10) of claim 1 further comprising a heat flux sensor (HF-1), a heat transfer plate temperature transmitter (TT-1), and a heating/cooling element temperature transmitter (TT-3), each operably connected to the HTSM cell (10).

8. The HTSM cell (10) of claim 1, wherein HTSM cell (10) is a removable cassette (88).

9. A heat transfer surface monitoring (HTSM) system (26) for use in monitoring scaling, fouling, pitting, and corrosion, of a heat transfer surface, the system comprising:
   a) the heat transfer surface monitoring (HTSM) cell (10) of claim 1;
   b) a surface imaging module (44) having imaging components of a camera (66) and a lens (82), the surface imaging module (44) configured and located relative to the heat transfer surface monitoring system so as to be operable to:
      i) capture at least one of an image and a reflectance spectra of the first surface (106) of the heat transfer plate (16) of the HTSM cell (10);
      (ii) create at least one of an image data signal and a spectral signal indicative of the image and the reflectance spectra;
   c) an image processing system operatively linked to the surface imaging module (44) so as to receive the image data signal therefrom, the image processing system being operable to analyze the image data signal so as to provide an indication of an extent of at least one of scaling, fouling, corrosion, and pitting, on the heat transfer plate (16); and,
   d) a system controller (12) operable to control at least of one of illumination, image capturing, spectra capturing, image data management, image analysis, and external data communication (100), inlet flow rate, and pressure on a fluid inlet feed side to be approximately that of a heat exchange equipment being monitored.

10. The HTSM system (26) of claim 9, wherein the HTSM cell (10) is a removable cassette (88) capable of being inserted removed from the HTSM system without repositioning of the surface imaging module (44).

11. The HTSM system (26) of claim 9, wherein the image processing system is configured to determine at least one of:
   a) a percent and density of surface area of the heat transfer plate (16) of at least one of fouling, scaling, corrosion, and pitting; and, b) a type of fouling, scaling, corrosion, and pitting based on geometric shape analysis and spectral analysis of images.

12. The HTSM system (26) of claim 11, wherein the image processing system is configured to identify at least one of fouling, scaling, pitting and corrosion on the first surface (106) of the heat transfer plate (16) based on at least one of:
   a) a geometric shape and a size analysis; and,
   b) a spectral analysis of images capture by the image processing system, through the use of spectral analysis and pattern recognition.

13. The HTSM system (26) of claim 9 further comprises:
a heat flux sensor (HF-1), a heat transfer plate temperature transmitter (TT-1), and a heating/cooling element temperature transmitter (TT-3) operably connected to the HTSM cell (10); and,
a flow meter (FT-1), a flow control valve (CV), a feed temperature transmitter (TT-2), an inlet pressure meter (PT-1), an outlet temperature transmitter (TT-4), and a conductivity transmitter (CT-1) operatively connected to the system controller (12),
wherein the system controller (12) is operable to receive, control, and adjust flow rate, temperature, heat flux and pressure in response to received signals transmitted from at least one of the heat flux sensor, the heat transfer plate temperature transmitter, the heating/cooling element temperature transmitter, the flow meter, the feed temperature transmitter, the inlet pressure meter, the outlet temperature transmitter, and the conductivity transmitter,
wherein the HTSM system (26) is capable of being operated at a substantially same pressure as a heat exchange equipment (110) segment being monitored, and wherein flow velocity and heat transfer surface plate temperature in the HTSM cell (10) is capable of being regulated and set at specific values to establish target hydrodynamic and heat transfer conditions relative to conditions of the heat exchange equipment (110) segment being monitored.

14. A method of monitoring fouling, scaling, corrosion and pitting of a heat transfer surface, the method comprising:
   a) providing the HTSM cell (10) of claim 1;
   b) passing a fluid intake stream across the first surface (106) of the heat transfer plate (16);
   c) collecting data of at least one of visual and spectral imaging from an illuminated portion of the first surface (106) of the heat transfer plate (16); and,
   d) transmitting the collected data to an image processing system;
   e) interpreting the collected data with the image processing system to determine an extent of fouling, scaling, corrosion, and pitting.

15. The method of claim 14, further comprising a step of adjusting at least one of flow rate, pressure, and temperature in response to the extent of fouling, scaling, corrosion and pitting.

16. The method of claim 14, wherein the step of interpreting the collected data includes at least one of:
   a) displaying a real-time image of the surface of the heat transfer plate (16) and surface imaging spectra; and,
   b) correlating the collected data to at least one of fouling, scaling, corrosion, and pitting to a heat exchange equipment (110) being monitored.

17. The method of claim 14, wherein the light source (62) emits light in a range of at least one of visible light, UV light, and near infrared light.

18. A heat transfer surface monitoring (HTSM) cell for use in monitoring scaling, fouling, pitting, and corrosion, of a heat transfer surface, the cell comprising:
   a) a heat exchanger cylindrical tube (200) having a viewable inner surface (140);
   b) a light guide operable to allow light to enter from outside of the heat exchanger cylindrical tube to illuminate the viewable inner surface (140);
   c) a light source (140, 62) operable to illuminate the viewable inner surface (140) of the heat exchanger cylindrical tube (200);
   d) an fluid inlet conduit (52) positioned to allow fluid to enter within the heat exchanger cylindrical tube (148), and a fluid outlet conduit (54) designed to allow fluid to exit the heat exchanger cylindrical tube (148); and
   e) a surface imaging module affixed to the heat exchanger cylindrical tube and positioned above an optical window to view the viewable inner surface (140) of the heat exchanger cylindrical tube (200).

19. The HTSM cell of claim 18, further comprising a heating/cooling element circumferentially affixed at least over a segment of the heat exchanger cylindrical tube, thereby adding control over heat transfer in the HTSM cell.

20. The HTSM cell of claim 18, wherein the light guide is a side transparent window (142) positioned at the longitudinal end of the heat exchanger cylindrical tube (200), and the light source (62) is positioned adjacent the side transparent window (200) to allow for low-angle illumination of the viewable surface of the heat exchange cylindrical tube (140).

21. The HTSM cell of claim 18, wherein the light guide is a slit light guide (148) incorporated within an outer circumference of a wall of the heat exchanger cylindrical tube (200) and extending to an inner circumference of the heat exchanger cylindrical tube (200), thereby allowing light illuminate the viewable inner surface (140), and wherein the light source (146) is positioned along an inner surface of the heat exchanger cylindrical tube.

22. A method of monitoring fouling, scaling, corrosion and pitting of a heat transfer surface, the method comprising:
   a) providing the HTSM cell of claim 18;
   b) passing a fluid intake stream through the heat exchanger cylindrical tube and over the viewable inner surface;
   c) collecting data of at least one of visual and spectral imaging from an illuminated portion of the viewable inner surface;
   d) transmitting the collected data to an image processing system; and,
   e) interpreting the collected data with the image processing system to determine an extent of fouling, scaling, corrosion, and pitting.

* * * * *